US005787334A

United States Patent [19]

Fardeau et al.

[11] Patent Number: 5,787,334

[45] **Date of Patent: *Jul. 28, 1998**

[54] METHOD AND APPARATUS FOR AUTOMATICALLY IDENTIFYING A PROGRAM INCLUDING A SOUND SIGNAL

[75] Inventors: Michel Fardeau, Les Milles; Michel Briend, Roquevaire; Marc Tommasi, Ventabren; Serge Galant, Aix-en-Provence, all of France

[73] Assignee: Ceridian Corporation, Columbia, Md.

[ * ] Notice: The term of this patent shall not extend beyond the expiration date of Pat. No. 5,581,800.

[21] Appl. No.: 721,705

[22] Filed: Sep. 27, 1996

Related U.S. Application Data

[62] Division of Ser. No. 476,499, Jun. 7, 1995, Pat. No. 5,581,800, which is a division of Ser. No. 360,990, Dec. 20, 1994, Pat. No. 5,574,962, which is a continuation of Ser. No. 936,111, Aug. 27, 1992, abandoned.

[30] Foreign Application Priority Data

Sep. 30, 1991 [FR] France .................................. 91 11989

[51] Int. Cl.[6] .................................................. H04B 17/00

[52] U.S. Cl. .................................................. 455/2; 348/2

[58] Field of Search ................................ 455/2, 4.1, 5.1, 455/6.1, 6.2, 6.3, 100, 68, 103; 348/2, 1, 907, 4, 5, 6, 7, 12, 13, 14, 15, 16, 17, 18; H04N 7/16, 7/173

[56] References Cited

U.S. PATENT DOCUMENTS

| | | | |
|---|---|---|---|
| 2,660,511 | 11/1953 | Scherbatskoy et al. | 346/37 |
| 2,662,168 | 12/1953 | Scherbatskoy et al. | 250/2 |
| 2,766,374 | 10/1956 | Hoffmann | 250/2 |
| 3,004,104 | 10/1961 | Hembrooke | 179/2 |
| 3,163,856 | 12/1964 | Kirby | 340/279 |
| 3,253,588 | 5/1966 | Vuilleumier et al. | 128/2 |
| 3,803,349 | 4/1974 | Watanabe | 178/5.8 R |
| 3,845,391 | 10/1974 | Crosby | 325/64 |
| 4,025,851 | 5/1977 | Haselwood et al. | 325/31 |
| 4,107,734 | 8/1978 | Percy et al. | |
| 4,107,735 | 8/1978 | Frohbach | |
| 4,225,967 | 9/1980 | Miwa et al. | 455/68 |
| 4,230,990 | 10/1980 | Lert, Jr. et al. | 455/67 |
| 4,258,386 | 3/1981 | Cheung | |

(List continued on next page.)

FOREIGN PATENT DOCUMENTS

| | | | |
|---|---|---|---|
| 1 208 761 | 7/1986 | Canada | H04N 7/16 |
| 2033558 | 9/1991 | Canada | |
| 2036205 | 12/1991 | Canada | H04H 9/00 |
| 2559002 | 8/1985 | France | H04B 1/00 |
| WO 91/11062 | 7/1991 | WIPO | H04B 17/00 |

OTHER PUBLICATIONS

Namba, Seiichi, et al., "A Program Identification Code Transmission System Using Low–Frequency Audio Signals"; NHK Laboratories Note; Ser. No. 314, Mar. 85.

*Primary Examiner*—Christopher C. Grant
*Attorney, Agent, or Firm*—Eugene L. Flanagan, III

[57] ABSTRACT

A method and apparatus for automatically identifying a program broadcast by a radio station or by a television channel, or recorded on a medium, by adding an inaudible encoded message to the sound signal of the program, the message identifying the broadcasting channel or station, the program, and/or the exact date. In one embodiment the sound signal is transmitted via an analog-to-digital converter to a data processor enabling frequency components to be split up, enabling the energy in some of the frequency components to be altered in a predetermined manner to form an encoded identification message, and with the output from the data processor being connected via a digital-to-analog converter to an audio output for broadcasting or recording the sound signal. In another embodiment, an analog band-pass filter is employed to separate a band of frequencies from the sound signal so that energy in the separated band may be thus altered to encode the sound signal. The invention is particularly applicable to measuring the audiences of programs that are broadcast by radio or television, or that are recorded.

9 Claims, 2 Drawing Sheets

U.S. PATENT DOCUMENTS

| | | | |
|---|---|---|---|
| 4,308,554 | 12/1981 | Percy et al. . | |
| 4,425,642 | 1/1984 | Moses et al. | 370/76 |
| 4,450,531 | 5/1984 | Kenyon et al. | 364/604 |
| 4,547,804 | 10/1985 | Greenberg | 358/142 |
| 4,567,511 | 1/1986 | Smith et al. . | |
| 4,584,602 | 4/1986 | Nakagawa . | |
| 4,613,904 | 9/1986 | Lurie | 358/142 |
| 4,618,995 | 10/1986 | Kemp | 455/2 |
| 4,626,904 | 12/1986 | Lurie | 358/84 |
| 4,639,779 | 1/1987 | Greenberg | 358/142 |
| 4,642,685 | 2/1987 | Roberts et al. . | |
| 4,646,145 | 2/1987 | Percy et al. . | |
| 4,652,915 | 3/1987 | Heller . | |
| 4,658,290 | 4/1987 | McKenna et al. . | |
| 4,677,466 | 6/1987 | Lert, Jr. et al. | 358/84 |
| 4,695,879 | 9/1987 | Weinblatt . | |
| 4,697,209 | 9/1987 | Kiewit et al. | 358/84 |
| 4,703,476 | 10/1987 | Howard | 370/76 |
| 4,718,106 | 1/1988 | Weinblatt | 455/2 |
| 4,779,198 | 10/1988 | Lurie . | |
| 4,805,020 | 2/1989 | Greenberg | 358/147 |
| 4,843,562 | 6/1989 | Kenyon et al. | 364/487 |
| 4,876,617 | 10/1989 | Best et al. | 360/60 |
| 4,907,079 | 3/1990 | Turner et al. . | |
| 4,930,011 | 5/1990 | Kiewit | 358/84 |
| 4,931,871 | 6/1990 | Kramer | 358/142 |
| 4,945,412 | 7/1990 | Kramer | 358/142 |
| 4,952,913 | 8/1990 | Pauley et al. | 340/573 |
| 4,955,070 | 9/1990 | Welsh et al. | 455/2 |
| 4,967,273 | 10/1990 | Greenberg | 358/142 |
| 4,972,471 | 11/1990 | Gross et al. | 380/3 |
| 4,973,952 | 11/1990 | Malec et al. . | |
| 5,023,929 | 6/1991 | Call | 455/2 |
| 5,080,479 | 1/1992 | Rosenberg | 352/92 |
| 5,113,437 | 5/1992 | Best et al. | 380/3 |
| 5,155,762 | 10/1992 | Croquet et al. . | |
| 5,213,337 | 5/1993 | Sherman | 273/439 |
| 5,382,970 | 1/1995 | Kiefl | 455/2 X |
| 5,483,276 | 1/1996 | Brooks et al. | 348/2 |

METHOD AND APPARATUS FOR AUTOMATICALLY IDENTIFYING A PROGRAM INCLUDING A SOUND SIGNAL

This application is a division of application Ser. No. 08/476,499, filed Jun. 7, 1995 now U.S. Pat. No. 5,581,800 which is a division of application Ser. No. 08/360,990, filed Dec. 20, 1994, now U.S. Pat. No. 5,574,962 which is a continuation of application Ser. No. 07/936,111, filed Aug. 27, 1992 abandoned.

BACKGROUND

The invention relates to a method and to apparatus for automatically identifying a program including a sound signal, such as a radio program or a television program, in particular, or a program recorded on a medium such as a microgroove disk, a magnetic tape, a compact disk for reading by laser, or a video disk.

Such automatic identification of programs is applicable to measuring the audience of radio stations or television channels, to monitoring the inclusion of advertising programs in television or radio broadcasts, or indeed to keeping an account of royalties due to authors or to performers for public broadcasting of their works.

It has been proposed to add an inaudible coded message to the sound signal of a program to be identified, the encoded message comprising information such as the identity of the broadcasting channel or station, the identity of the program, and possibly the exact date of transmission. A specialized decoder associated with a television or radio receiver serves to extract the encoded message added to the sound signal and to record it in a memory.

To ensure that the encoded message is inaudible on being output from the loudspeaker(s) of a receiver, it must either be at a very low frequency (e.g. 40 Hz), or else it must be at an audible frequency but emitted at a level that is well below the level of the sound signal (in the range −50 dB to −60dB).

The essential drawback of these proposed means is that they require a specialized decoder to be integrated in the television or radio receiver. The characteristics of the loudspeakers in such receivers are such that in general they do not pass signals at frequencies below about 100 Hz. When the encoded message is emitted on an audible frequency but at a level that is well below the level of the sound signal, it is also very difficult to pick up the message using a microphone, particularly since the directivity of a loudspeaker increases with frequency, as does the attenuation of the signal it reproduces.

Another proposed technique consists in using one type of modulation for broadcasting the sound signal and another type of modulation for broadcasting the encoded message. Here again, it is necessary for a specialized decoder to be integrated in the receiver in order to be able to recover the encoded message.

OBJECTS AND SUMMARY OF THE INVENTION

An object of the present invention is to provide a method and apparatus for automatically identifying a program including a sound signal in which there is an inaudible encoded message, by means of a decoder that is totally independent of the receiver for receiving the program.

Another object of the invention is to provide a method and apparatus of this type enabling the audiences of radio and television broadcasts to be measured.

Yet another object of the invention is to provide a method and apparatus of this type which makes it simple to monitor the broadcasting of works recorded on media such as microgroove disks, magnetic tapes, compact disks for reading by laser, or video disks.

To this end, the present invention in accordance with one aspect thereof provides a method of automatically identifying a program that includes a sound signal, by including an inaudible encoded message in the sound signal, the message containing data corresponding to the identity of a broadcasting channel or station, to the identity of the program, and/or to the exact date of broadcasting, the method comprising the steps of selecting at least one narrow band of audible frequencies in the sound signal, altering the energy of the sound signal in said frequency band in a characteristic manner that is predetermined and repeated, and broadcasting the sound signal including the alterations or in recording it on a medium.

Preferably, the alterations to the energy in the sound signal in said frequency band are of the pulse or quasi-pulse type.

Compared with the prior art, this method presents several advantages:

- the alterations applied to the energy of the sound signal in a narrow band of audible frequencies can be reproduced without difficulty by the loudspeaker of a receiver while still remaining completely inaudible, regardless of the quality of the loudspeaker;
- a program-identifying message can be built up by repeating these alterations in compliance with a predetermined code, which message may include a relatively large amount of information such as the identity of the broadcasting channel or station, the identity of the program itself, and the exact date of transmission;
- the quality of the sound signal including the encoded message is not audibly degraded;
- the general frequency spectrum of the sound signal is not perceptibly changed by adding the encoded message;
- the total energy of the sound signal is not perceptibly changed;
- the method of the invention is applicable regardless of the type of modulation used for transmitting the sound signal;
- the encoded identity message may be detected in the sound signal reproduced by the loudspeaker of a receiver (or of an apparatus for playing back a recording) by means of a decoder situated within the listening area of the loudspeaker without there being a need to provide any kind of connection between the decoder and the receiver or playback device;
- the decoder may be portable; and
- it may be installed permanently in the listening area of the loudspeaker of a receiver or playback device, or else it may be carried about by a person.

According to another aspect of the invention, the method comprises comparing the energy of the sound signal in said frequency band with a threshold and in altering said energy only if it is greater than the threshold.

In this way, the encoded message is not added to the sound signal of the program during periods of silence, during which it would otherwise be audible.

The duration of the pulses altering the sound signal in said narrow frequency band is preferably less than about 100 ms, e.g. about 10 ms.

The repetition rate of these pulses may lie in the range 5 Hz to 20 Hz, for example.

The narrow frequency band including the encoded message preferably lies between about 100 Hz and about 700 Hz and may be a few tens of hertz wide.

The energy of the sound signal in said frequency band may be altered by reducing said energy to a value that is substantially zero, or on the contrary by increasing said energy to a predetermined value.

According to another aspect of the invention, the method also comprises selecting at least two narrow frequency bands of the sound signal and in altering the energy of the sound signal in said two frequency bands simultaneously in a manner that is predetermined and repeated to encode the identity message.

The encoding data rate can thus be increased by simultaneously adding different portions of the message in a plurality of narrow frequency bands in the sound signal.

It is thus also possible to improve the inaudibility of the encoded message by reducing the energy of the sound signal in one frequency band while increasing said energy in another frequency band so as to compensate for the changes of energy in the sound signal between the two frequency bands.

According to another aspect of the invention, the method comprises splitting up the sound signal into frequency components, either in analog manner by filtering or else in digital manner by a Fourier transform or by a wavelet transform, altering the energy of the frequency components lying in the above-mentioned frequency band(s) in a manner that is predetermined, and then rebuilding the sound signal and in broadcasting it or recording it on a medium.

According to yet another aspect of the-invention, the method comprises picking up the sound signal containing the encoded identification message when the signal is reproduced by a loudspeaker, detecting the alterations made to the energy of the signal in at least one of the above-mentioned frequency bands, deducing the encoded identification message therefrom, and storing the message in a memory.

One or more frequency components are extracted from the sound signal picked up at the outlet from the loudspeaker either in analog manner by filtering or in digital manner by a Fourier transform, or by a wavelet transform, and then the above-mentioned alterations that constitute the encoded message are detected in the frequency component(s) corresponding to the above-mentioned narrow frequency band(s).

In accordance with a still further aspect, the invention also provides apparatus for automatically identifying a program that includes a sound signal conveying an inaudible encoded message comprising data corresponding to the identity of a broadcasting channel or station, to the identity of the program, and/or to the exact date of broadcasting, the apparatus comprising means enabling the energy of the sound signal in at least one previously determined narrow band of audible frequencies to be altered in a manner that is predetermined and repeated, the set of alterations produced in this way constituting the encoded message.

This apparatus further comprises code generation means transforming channel, station, program and/or date identity data into a least one sequence of pulse or quasi-pulse signals defining the alterations to be made to the energy of the sound signal in the, or each, above-mentioned frequency band.

Preferably, this apparatus comprises means for comparing the energy of the signal in said frequency band with a threshold, and means for preventing said energy being altered when it is below the threshold.

In a first embodiment, this apparatus comprises analog-to-digital conversion means for the sound signal, said conversion means being connected to data processing means receiving the digitized signal and designed to split it up into frequency components, to alter the energy of the signal in said frequency band in compliance with the encoded message to be included, and to rebuild the signal from its frequency components, together with digital-to-analog conversion means connected to the output of the data processing means.

In another embodiment, this apparatus comprises a set of frequency filters connected in parallel and receiving the sound signal on their inputs, said set comprising at least one bandpass filter for extracting the above-mentioned narrow frequency band from the sound signal and for applying it to one input of a controlled switch whose other input is connected to an output of code generator means, the set of filters also comprising lowpass and highpass filters for transmitting the frequencies of the sound signal that are not included in the above-mentioned frequency band, and a summing circuit whose inputs are respectively connected to the output of the controlled switch and to the outputs of the lowpass and highpass filters to reconstitute the sound signal.

In accordance with yet another aspect, the invention also provides at least one device for decoding the message included in the sound signal, said device being intended to be located in range of a loudspeaker reproducing the signal, the device comprising a microphone for picking up the signal reproduced by the loudspeaker, means for processing said signal to detect the alterations made to the energy of the signal in the above-mentioned narrow frequency band(s) and for deducing therefrom the message included in the signal, and means for storing said message in a memory.

In a first embodiment, the decoding device comprises an analog-to-digital converter connecting the output of the microphone to the input of data processing means including at least one microprocessor enabling the signal digitized at the output from the microphone to be split up into frequency components, enabling the alterations of the energy in the frequency components of the signal to be detected in the above-specified frequency band(s), enabling the encoded message to be deduced therefrom, and enabling it to be recorded in a memory.

In another embodiment, the decoding device comprises at least one bandpass filter receiving the output signal from the microphone to extract therefrom the frequency band conveying the encoded message and to apply it to analog circuits for detecting the alterations made to the sound signal in said frequency band.

The decoding device is easily made portable and may include a motion detector.

In accordance with a still further aspect of the invention, a method of estimating an audience for widely disseminated audible information is provided wherein the widely disseminated audible information includes an inaudible identification code indicating a source thereof and included within at least one band of frequencies of the widely disseminated audible information by modifying an energy level of a portion of an audible signal of the widely disseminated audible information within the at least one band of frequencies. The method comprises the steps of: selecting a group of individuals from among the audience; providing each of the individuals with a respective personal monitoring device capable of being carried on the person of each such individual, the personal monitoring device including means for converting sounds including the widely disseminated audible information received thereby into a processing signal, means for extracting the inaudible identification code from the processing signal by detecting the modifications to the energy level thereof within the at least one band of frequencies, and means for storing information from the extracted code indicating the source of the widely disseminated audible information; collecting information concerning widely disseminated audible information provided to each of the group of individuals during a predetermined time period with the use of each respective personal monitoring device carried thereby by extracting inaudible identification codes from processing signals converted from sounds including said widely disseminated audible information received by the respective monitoring device carried by each of the group of individuals and storing the information from the extracted code; and producing an estimate of the audience for at least one source of widely disseminated audible information based on the collected information.

In accordance with yet still another aspect of the invention, a monitoring device is provided for use in collecting information for estimating an audience for widely disseminated audible information while carried on the person of an individual audience member, the widely disseminated audible information including an inaudible identification code indicating a source thereof and included within at least one band of frequencies of the widely disseminated audible information by modifying an energy level of a portion of an audible signal of the widely disseminated audible information within the at least one band of frequencies. The monitoring device comprises: an enclosure; means for attaching the enclosure to the person of an individual audience member; transducing means for converting sounds including the widely disseminated audible information received thereby into a processing signal; code extraction means for extracting the inaudible identification code from the processing signal by detecting the modifications to the energy level thereof within the at least one band of frequencies; and storage means for storing information from the extracted code indicating the source of the widely disseminated audible information; the transducer means, the code extraction means and the storage means being carried within the enclosure.

BRIEF DESCRIPTION OF THE DRAWINGS

The invention will be better understood and other aspects, details, and advantages thereof will appear more clearly on reading the following description given by way of example and with reference to the accompanying drawings, in which.

DETAILED DESCRIPTION OF CERTAIN ADVANTAGEOUS EMBODIMENTS

Figure 1:
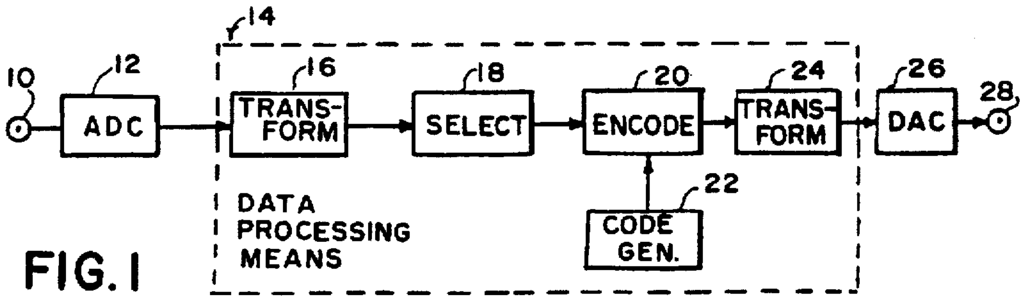
FIG. 1 is a block diagram of apparatus of the invention for encoding a sound signal as broadcast by a radio station or by a television channel, or as recorded on a medium.

Reference is made initially to FIG. 1 which is a block diagram of a first embodiment of apparatus for encoding the sound signal of a program transmitted by a radio station or by a television channel, or else recorded on a medium such as a microgroove disk, a magnetic tape, a compact disk for reading by laser, or a video disk.

The apparatus of the invention is designed to add an inaudible encoded identification message to the sound signal of the program that is to be broadcast or recorded on the medium.

To do this, the apparatus comprises an input 10 for the sound signal to be encoded, connected to the input of an analog-to-digital converter 12 whose output is connected to an input of data processing means 14 including at least one microprocessor, working memories, and memories for storing data.

The data processing means 14 are designed to perform an operation 16 of splitting up the digitized signal provided by the converter 12 into frequency components, with the splitting being conventionally performed by a Fourier transform, or else by a wavelet transform, thereby splitting up the signal in a frequency-time space. This wavelet transform is now well known to the person skilled in the art who may, if necessary, make reference to an article published in September 1987 at pages 28 to 37 in the journal "Pour la Science".

The digitized signal is split up into wavelets or Fourier series by executing a program recorded in a memory of the data processing means 14 and serves to encode one or more narrow frequency bands of the sound signal to include an encoded identification message therein. The frequencies chosen for encoding are audible frequencies, higher than about 100 Hz so as to lie in the passbands of the loudspeakers of television or radio broadcast receivers or devices for playing back recordings. These frequencies are also less than 1000 Hz in order to avoid problems associated with loudspeaker directivity and with the attenuation of sound energy propagating in air, both of which problems increase with frequency.

The frequencies selected for encoding the sound signal are preferably chosen to lie in the range about 100 Hz to about 700 Hz. In practice, the identification message is not encoded on a single frequency, but on a relatively narrow band of frequencies having a bandwidth of a few tens of hertz, e.g. 50 Hz, or on a plurality of such narrow frequency bands.

The following operation 18 performed by the data processing means 14 consists in selecting frequency components of the signal corresponding to one or more of such narrow frequency bands in accordance with data that is previously stored in its memory.

The following operation 20 consists in encoding the energy in the selected frequency components. The encoding is of the pulse or quasi-pulse type and consists essentially in reducing the energy of the sound signal in each narrow frequency band under consideration to a value of substantially zero or else in increasing said energy up to a predetermined value, with this being done for short periods of time that are preferably less than about 100 ms so that the encoded message included in the sound signal is inaudible.

The data processing means 14 include code generator means 22 which transform the data constituting the identification message into sequences of pulses, which data may be constituted, for example, by the name of a radio station or of a television channel, the name of the program, and the exact date of broadcasting or recording. This data may be transformed by the means 22 into a sequence of bits or pulses that modulate in corresponding manner the energy of the sound signal in a frequency band, or the data may be transformed into a plurality of sequences of bits or pulses that modulate the energy of the sound signal simultaneously in a plurality of frequency bands to increase the code rate.

It is also possible in this way to increase the inaudibility of the code message added to the sound signal, for example by encoding the message simultaneously by increasing the energy of the sound signal in one frequency band while reducing the energy in another frequency band.

The energy in the sound signal within a frequency band is preferably not encoded unless the energy therein is above a minimum value, so as to avoid adding the code message to the sound signal during a period of silence. This can be done merely by providing for the program recorded in a memory of the data processing means 14 to compare the energy of the sound signal in the frequency band under consideration with a predetermined threshold, to perform encoding of said energy so long as it is greater than the threshold, and to stop encoding when the energy is below the threshold.

The following operation 24 performed by the data processing means 14 consists in reconstituting a sound signal in digital form from the frequency components of the input signal that have not been encoded and the components that have been encoded. A digital signal is thus obtained at the output of the data processing means 14 corresponding to the input signal but including an encoded identification message.

This signal is applied to the input of a digital-to-analog converter 26 whose output is connected to an audio output 28 leading to conventional broadcasting or recording means.

Figure 2:
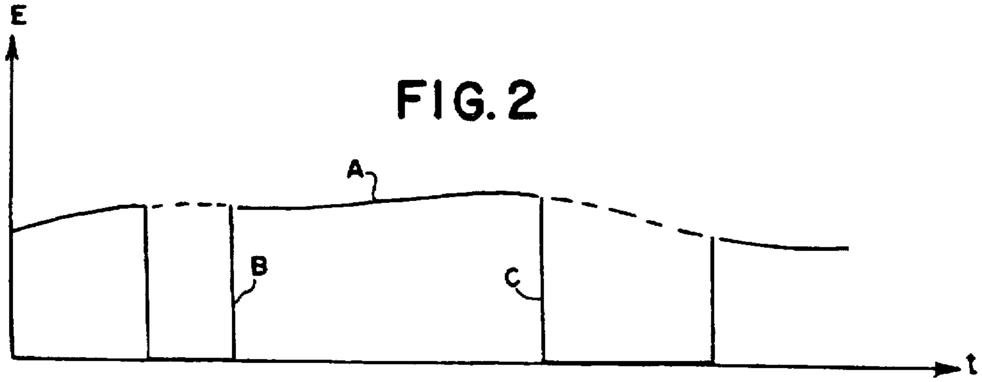
FIG. 2 is a graph showing diagrammatically a portion of the way the signal is encoded in a narrow frequency band.

FIG. 2 is a diagram showing one example of how the energy of the sound signal may be encoded in a narrow band of audible frequencies. Curve A shows how the energy of the sound signal varies as a function of time, and notches B and C show two code pulses during which the energy is reduced to substantially zero. In the example shown, the first pulse B has a duration of 10 ms, the second pulse C has twice the duration, i.e. 20 ms, and it begins about 50 ms to about 100 ms after the beginning of the first pulse B.

Any type of code may be used for transforming the data of the identification message into sequences of pulses, and, for example, such codes may be characterized by pulses of fixed or varying duration, by the repetition rate of the pulses, by groups of pulses, etc.

In general, the identification message may be encoded on a number of bits lying in the range about 50 to about 100, thereby including sufficient redundancy to reduce the risks of error on decoding, with the duration of the encoded identification message lying in the range about 3 s to about 20 s and with the repetition rate of its bits lying in the range 5 Hz to 20 Hz.

Under such conditions, the encoded identification message included in the sound signal is inaudible when the signal is reproduced by a high quality loudspeaker.

Figure 3:
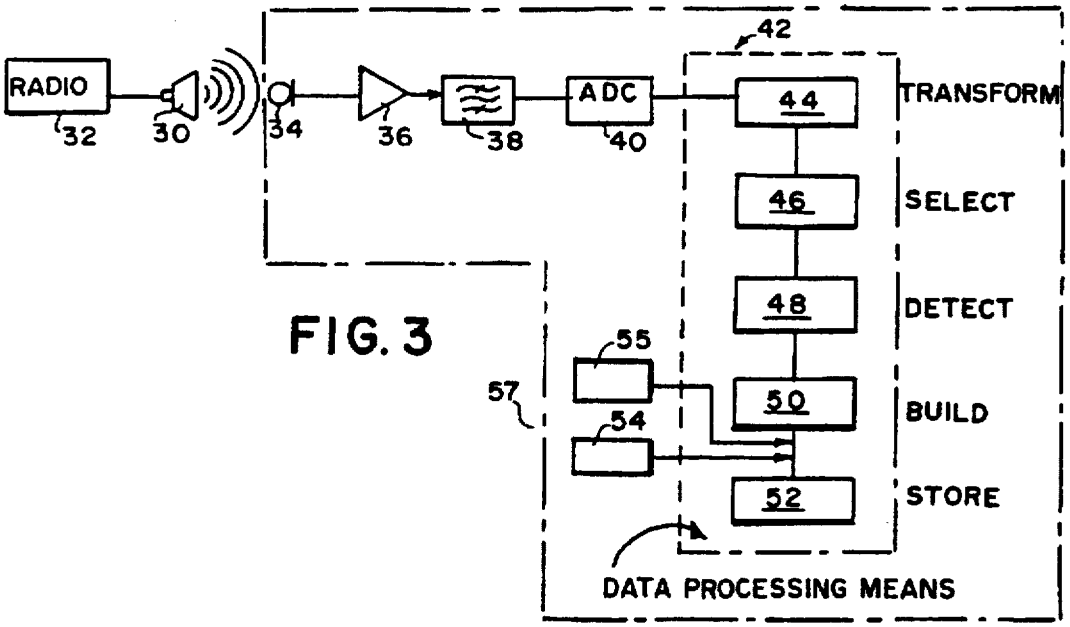
FIG. 3 is a block diagram showing a decoder device in accordance with the invention.

FIG. 3 is a block diagram of a decoding device of the invention which is placed in the listening area of a loudspeaker 30 of a device 32 for receiving a program or for playing back a recording of the program.

The decoding device comprises a microphone 34 picking up the sound signal reproduced by the loudspeaker 30, and connected via amplifier means 36 to a bandpass filter 38 whose passband comprises the narrow frequency band(s) that convey the encoded message identifying the program. The output from the filter 38 is connected by an analog-to-digital converter 40 to an input of data processing means 42 which comprise at least one microprocessor together with working memory and memory for storing data. These data processing means 42 begin at 44 by splitting up the frequencies of the digital signal provided by the converter 40, then at 46 in selecting the frequency components that include the encoded identification message, and then detecting at 48 the alterations in the energy of the signal in said frequency components that correspond to the code bits of the identification message. The following operation 50 consists in reconstituting the encoded message which is then stored in a memory 52.

The decoding device may optionally also include a motion detector 54, such as an accelerometer for example, with the output signal therefrom being added in any appropriate manner to the reconstituted code message prior to storing it in the memory, to indicate whether or not the decoding device is being moved by a person.

It is also possible to use a temperature detector 55 in addition to the motion detector, since the temperature of the decoding device increases perceptibly if it is worn by a person. Where the decoding device is worn by a person it is housed in a appropriate enclosure, indicated schematically by the one-dot chain line 57 in FIG. 3, including appropriate means for attaching the enclosed decoding device to the person or the person's clothing. Advantageously, the enclosure is the size of a pager or smaller to permit it to be worn comfortably and conveniently by the person.

The advantage of such motion and/or temperature detectors is, for example, that it makes it possible to associate the identity of the person wearing the decoding device with the automatic identification of the programs that person listens to on a radio or a television or on a device for playing back a recording.

The decoding device of the invention thus makes it possible to store in its memory the program identification messages that it picks up successively over some length of time. The contents of the memory can be transferred at regular intervals by any appropriate means to a central processor unit which decodes the identification messages and deduces program audience measurements therefrom, or which lists the programs picked up by a decoding device placed at a given fixed location. The data collected by the central unit can also be used to monitor the broadcasting of advertising programs.

Figure 4:
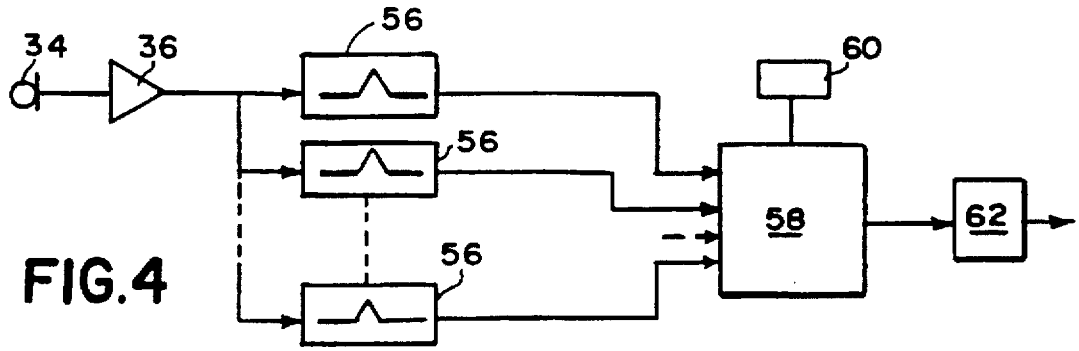
FIG. 4 is a block diagram showing a variant embodiment of the decoder device.

FIG. 4 is a diagram showing another embodiment of the decoding apparatus, in which the sound signal picked up by the microphone 34 is processed by analog means instead of by digital means.

To do this, the output from the microphone 34 is connected via the amplifier means 36 to a set of filters 56 connected in parallel, with the outputs therefrom being connected to the inputs of a circuit or set of circuits 58 for detecting code pulses formed in the above-mentioned narrow frequency bands. In conventional manner, a synchronizing clock 60 is associated with the circuit 58 or with each of the circuits 58.

The output from the, or each, circuit 58 is connected to means 62 for rebuilding the encoded message, which message is then stored in a memory.

Each filter 56 is a switched capacitance filter enabling a frequency band to be extracted from the sound signal picked up by the microphone 34 corresponding to one of the frequency bands selected in the encoding apparatus. The passband of each of the filters 56 may possibly be greater than that of the frequency band used for encoding the identification message, e.g. because of distortion or harmonic dispersion in the sound signal as played back by the loudspeaker. It is also possible to provide a plurality of filters 56 having substantially adjacent passbands.

The bits constituting the enclosed message are detected in the circuit(s) 58 by detecting rising and falling edges in the energy alterations in the sound signal or in the frequency bands in question, and by monitoring the durations of such alterations.

Figure 5:
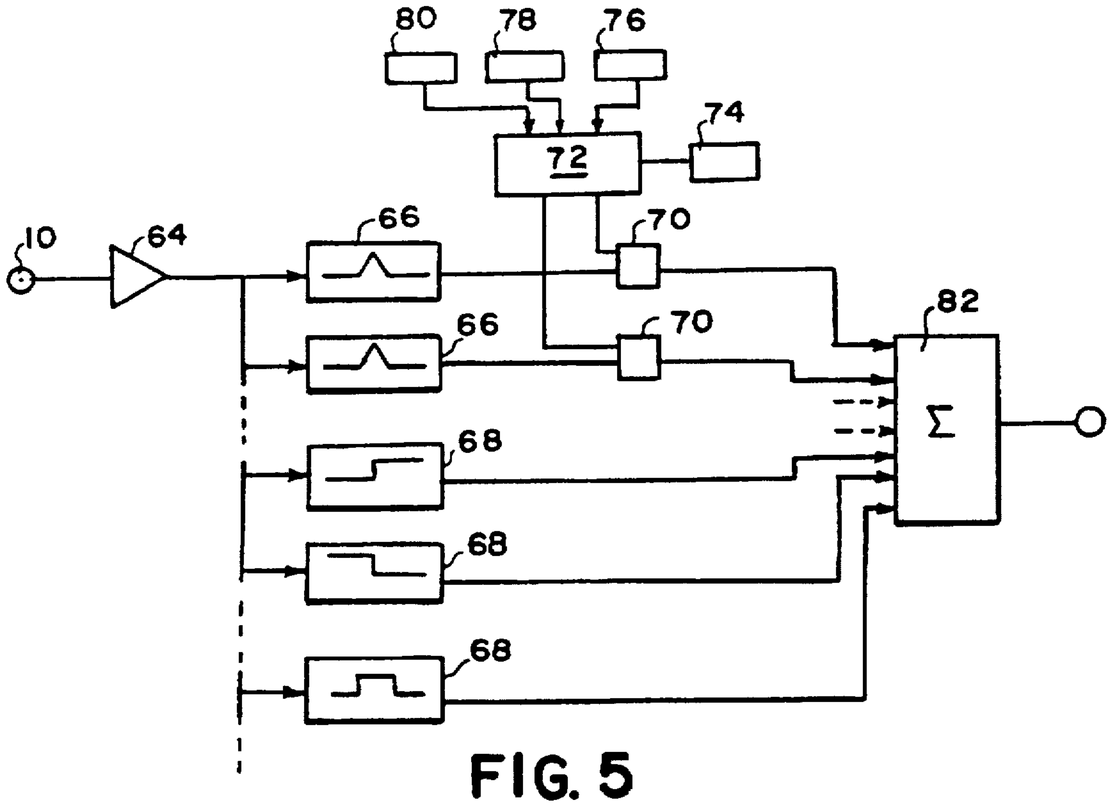
FIG. 5 is a block diagram of a variant embodiment of the device for encoding the sound signal of a program.

FIG. 5 is a block diagram of another embodiment of the encoding apparatus, which in this case is of the analog type.

The audio input 10 for the sound signal to be processed is connected via amplifier means 64 to a set of frequency filters connected in parallel and comprising one or more bandpass filters 66 whose pass bands correspond to the narrow frequency bands to be encoded, together with sets of highpass, lowpass, and possibly bandpass filters 68 for transmitting the frequency components of the sound signal that are not involved in the encoding.

The output from each bandpass filter 66 is connected to an input of a controlled switch 70 that performs the function of an AND gate and that has another input receiving a control signal provided by code generator means 72 associated with a synchronizing clock 74 and serving to transform into sequences of bits the data delivered thereto by means 76 for identifying the broadcasting channel or station, means 78 for identifying the program, and a clock 80 for dating purposes.

The outputs of the switches 70 are connected to inputs of a summing circuit 82 as are the outputs from the other filters 68. The output signal from the summing circuit 82 is the reconstituted initial sound signal but now including the encoded program identification message.

In general, the encoded identification signal may be added discontinuously to the program sound signal, or else continuously with the encoded message being repeated endlessly in the program sound signal.

The invention thus makes it possible to encode an identification message in the sound signal of a program, which message is inaudible when the sound signal is reproduced by loudspeakers, even if they are of very high quality, with the frequency and level characteristics of the encoded message nevertheless enabling it to be reproduced even by loudspeakers of very poor quality, thereby enabling the message to be picked up and extracted from the sound signal under very bad playback conditions.

The processing applied to the sound signal by the encoding apparatus gives rise to a delay in the transmission of the sound signal, which delay may be about 0.1 second to about 1 second. For a video program this requires the image and the sound to be resynchronized after the sound signal has been encoded. Such resynchronization is commonplace for the person skilled in the art.

We claim:

1. A personal monitoring device for use in collecting information concerning audio signals available to a person, the audio signals including an identification code, comprising:

an acoustic transducer having an output at which it provides a non-acoustic signal in response to audio signals;

a detection circuit coupled with the output of the acoustic transducer to receive the non-acoustic signal and operative to detect an identification code therein, the detection circuit having an output at which it provides a code detection signal representing the detected identification code;

a carry detection transducer having an output at which it provides a carry detection signal indicating that the personal monitoring device is being carried by a person; and a memory device coupled with the detection circuit and the carry detection transducer to store data representing the code detection signal and data representing the carry detection signal.

2. The personal monitoring device of claim 1, wherein the carry detection transducer comprises a motion detector.

3. The personal monitoring device of claim 1, wherein the carry detection transducer comprises a temperature detector.

4. The personal monitoring device of claim 1, wherein the detection circuit comprises a digital processor.

5. The personal monitoring device of claim 1, wherein the detection circuit comprises an analog processor.

6. A personal monitoring device for use in collecting information concerning audio signals available to a person, the audio signals including an identification code, comprising:

transducer means for producing a non-acoustic signal in response to audio signals;

code detection means for detecting an identification code in the non-acoustic signal to provide a code detection signal representing the identification code;

carry detection means for producing a carry detection signal indicating that the personal monitoring device is being carried by a person; and memory means for storing data representing the code detection signal and data representing the carry detection signal.

7. A method of collecting information concerning audio signals available to a person, the audio signals including an identification code, comprising:

providing a portable monitoring device including an acoustic transducer and an identification code detector;

detecting identification codes in audio signals received by the acoustic transducer using the identification code detector;

detecting signals indicating that the portable monitoring device is being carried by a person; and storing information representing the detected identification codes and the signals indicating that the portable monitoring device is being carried by a person.

8. The method of claim 7, wherein the step of detecting signals indicating that the portable monitoring device is being carried by a person comprises detecting motion.

9. The method of claim 7, wherein the step of detecting signals indicating that the portable monitoring device is being carried by a person comprises detecting temperature.

* * * * *